US009104207B2

United States Patent
Kim et al.

(10) Patent No.: US 9,104,207 B2
(45) Date of Patent: Aug. 11, 2015

(54) WALKING ROBOT AND CONTROL METHOD THEREOF

(75) Inventors: Joo Hyung Kim, Seongnam-si (KR); Kee Hong Seo, Seoul (KR); Kyung Shik Roh, Seongnam-si (KR); Jae Ho Park, Suwon-si (KR)

(73) Assignee: Samsung Electronics Co., Ltd., Gyeonggi-Do (KR)

( * ) Notice: Subject to any disclaimer, the term of this patent is extended or adjusted under 35 U.S.C. 154(b) by 739 days.

(21) Appl. No.: 13/308,842

(22) Filed: Dec. 1, 2011

(65) Prior Publication Data
US 2012/0165987 A1 Jun. 28, 2012

(30) Foreign Application Priority Data
Dec. 23, 2010 (KR) .................. 10-2010-0133210

(51) Int. Cl.
| | | |
|---|---|---|
| G05B 15/02 | (2006.01) | |
| G05D 1/08 | (2006.01) | |
| B62D 57/032 | (2006.01) | |

(52) U.S. Cl.
CPC ............ *G05D 1/0891* (2013.01); *B62D 57/032* (2013.01); *G05D 2201/0217* (2013.01)

(58) Field of Classification Search
CPC .............. B62D 57/032; B62D 57/02; G05D 2201/02172
USPC ......... 700/245, 250, 251, 252, 253, 254, 260, 700/261
See application file for complete search history.

(56) References Cited

U.S. PATENT DOCUMENTS

| | | | | |
|---|---|---|---|---|
| 7,657,345 | B2* | 2/2010 | Endo et al. | 700/249 |
| 2005/0001575 | A1* | 1/2005 | Furuta et al. | 318/568.12 |
| 2005/0102111 | A1* | 5/2005 | Dariush et al. | 702/41 |
| 2005/0165507 | A1* | 7/2005 | Shimizu et al. | 700/245 |
| 2006/0241809 | A1* | 10/2006 | Goswami et al. | 700/245 |
| 2007/0156283 | A1* | 7/2007 | Takenaka | 700/245 |
| 2009/0171503 | A1* | 7/2009 | Takenaka et al. | 700/250 |
| 2009/0299523 | A1* | 12/2009 | Kim et al. | 700/245 |
| 2010/0042256 | A1* | 2/2010 | Takenaka et al. | 700/245 |
| 2010/0141197 | A1* | 6/2010 | Moon et al. | 318/566 |
| 2010/0161118 | A1* | 6/2010 | Kwak et al. | 700/245 |

(Continued)

FOREIGN PATENT DOCUMENTS

KR 10-2011-0017500 2/2011

OTHER PUBLICATIONS

Asano et al., A Novel Gait Generation for Biped Walking Robots Based on Mechanical Energy Constraint, 2004, IEEE.*

(Continued)

*Primary Examiner* — Thomas G Black
*Assistant Examiner* — Sara Nelson
(74) *Attorney, Agent, or Firm* — Harness, Dickey & Pierce, P.L.C.

(57) ABSTRACT

A walking robot and a control method thereof. The control method of the walking robot which walks using two legs includes applying first virtual gravity torque including a vector component in the anti-gravity direction to respective joints of a support leg from among the two legs during walking, and applying second virtual gravity torque including a vector component in the gravity direction to respective joints of a swing leg from among the two legs during walking. Thereby, the walking robot implements a natural walking motion having a low energy consumption rate.

15 Claims, 9 Drawing Sheets

(56) References Cited

U.S. PATENT DOCUMENTS

2010/0185330 A1* 7/2010 Kwon .......................... 700/261
2013/0184861 A1* 7/2013 Pratt et al. .................... 700/245

OTHER PUBLICATIONS

Asano et al., Virtual Gravity and Coupling Control for Robotic Gait Synthesis, 2001, Research Gate.*
Park et al., Hybrid control for biped robots using impedance control and computed-torque control, 1999, IEEE.*
Wyeth et al., Distributed control of gait for a humanoid robot, 2004, Springer.*
Asano et al., "Virtual Gravity and Coupling Control for Robotic Gait Synthesis," 2001, Research Gate.*
Park et al., "Hybrid control for biped robots using impedance control and computed-torque control," 1999, IEEE.*

* cited by examiner (A)  (B)

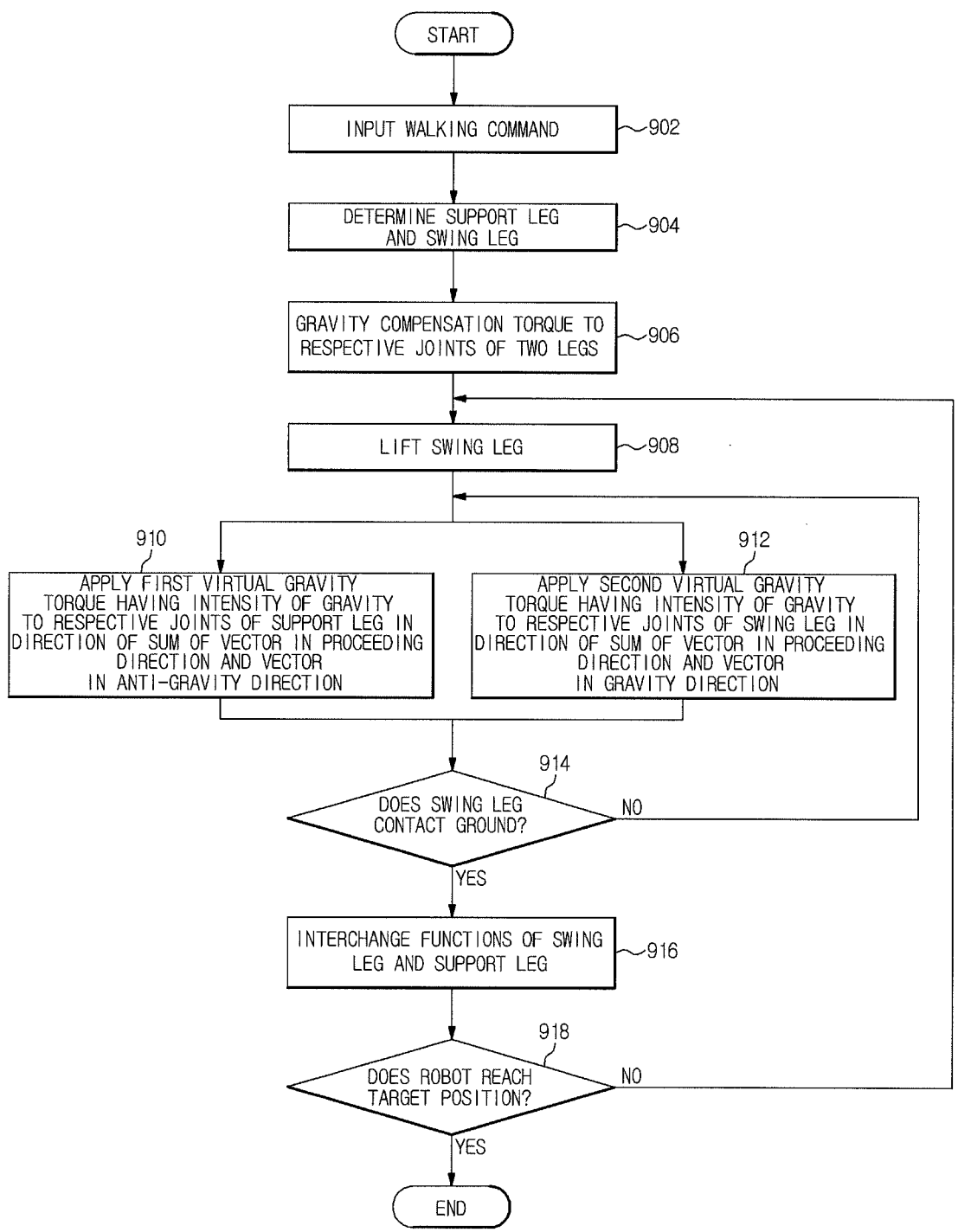

WALKING ROBOT AND CONTROL METHOD THEREOF

CROSS-REFERENCE TO RELATED APPLICATIONS

This application claims the benefit of Korean Patent Application No. 2010-0133210, filed on Dec. 23, 2010 in the Korean Intellectual Property Office, the disclosure of which is incorporated herein by reference.

BACKGROUND

1. Field

Embodiments relate to a walking robot and a control method thereof.

2. Description of the Related Art

In general, when a walking robot walks on a rough plane or an inclined plane, such as stairs, or meets an obstacle, a bipedal walking robot has a greater degree of mobility than a wheeled robot. Particularly, since a walking robot may lose balance and then fall, consideration of stability is essential when walking patterns of the robot are set.

In order to assure dynamic stability of walking robots, research into generation of walking patterns in consideration of a zero moment point (ZMP) has been proposed.

The ZMP means a point where the sum of all moments caused by forces generated from soles of feet of a walking robot equals 0. That is, the ZMP is a point where the intensity of reaction between the feet of the robot and the ground becomes 0 on a contact plane between the feet and the ground. If the ZMP is located within a support plane where the soles of the feet and the ground contact each other, the robot may walk without falling.

Only if the ZMP is located within the contact plane between the soles of the feet and the ground whenever the walking robot moves when behavior patterns of the robot are generated, the robot stably maintains balance.

Recently, methods of maintain balance of walking robots mostly employ a technique in which a strategy for movement of joints to locate the ZMP within the support plane is established and an optimization problem to satisfy constraints is solved.

These methods have drawbacks, such as local minima in solving the optimization problem and long computation time. Further, these methods need to design a control strategy to maintain balance of a robot according to a model of the robot. Such a strategy is varied according to a target robot system to be controlled, and is not east to be organized in a common method.

SUMMARY

Therefore, it is an aspect of an embodiment to provide a walking robot which implements a natural walking motion having a low energy consumption rate, and a control method thereof.

Additional aspects of embodiments will be set forth in part in the description which follows and, in part, will be obvious from the description, or may be learned by practice of embodiments.

In accordance with an aspect of an embodiment, a control method of a walking robot which walks using two legs includes applying first virtual gravity torque including a vector component in the anti-gravity direction to respective joints of a support leg from among the two legs during walking, and applying second virtual gravity torque including a vector component in the gravity direction to respective joints of a swing leg from among the two legs during walking.

The first virtual gravity torque may be applied in a direction of the sum of a vector in the proceeding direction and a vector in the anti-gravity direction, and the second virtual gravity torque may be applied in a direction of the sum of the vector in the proceeding direction and a vector in the gravity direction.

The first virtual gravity torque and the second virtual gravity torque may have the intensity of gravity.

The control method may further include applying gravity compensation torque to the respective joints of the two legs before the walking robot starts walking.

The control method may further include lifting the swing leg upward after applying gravity compensation torque to the respective joints of the two legs.

The control method may further include interchanging functions of the swing leg and the support leg, when the swing leg contacts the ground.

In accordance with another aspect of an embodiment, a walking robot includes two legs for walking, and a control unit to apply first virtual gravity torque including a vector component in the anti-gravity direction to respective joints of a support leg from among the two legs during walking, and to apply second virtual gravity torque including a vector component in the gravity direction to respective joints of a swing leg from among the two legs during walking.

The first virtual gravity torque may be applied in a direction of the sum of a vector in the proceeding direction and a vector in the anti-gravity direction, and the second virtual gravity torque may be applied in a direction of the sum of the vector in the proceeding direction and a vector in the gravity direction.

The first virtual gravity torque and the second virtual gravity torque may have the intensity of gravity.

The control unit may apply gravity compensation torque to the respective joints of the two legs before the walking robot starts walking.

The control unit may lift the swing leg upward after applying gravity compensation torque to the respective joints of the two legs.

The control unit may interchange functions of the swing leg and the support leg, when the swing leg contacts the ground.

In accordance with yet another aspect of an embodiment, a control method of a walking robot which walks using two legs includes applying gravity compensation torque to respective joints of the two legs before the walking robot starts walking, applying first virtual gravity torque having the intensity of gravity to respective joints of a support leg from among the two legs during walking in a direction of the sum of a vector in the proceeding direction and a vector in the anti-gravity direction, and applying second virtual gravity torque having the intensity of gravity to respective joints of a swing leg from among the two legs during walking in a direction of the sum of the vector in the proceeding direction and a vector in the gravity direction.

The control method may further include lifting the swing leg upward after the application of the gravity compensation torque to the respective joints of the two legs.

The control method may further include interchanging functions of the swing leg and the support leg, when the swing leg contacts the ground.

BRIEF DESCRIPTION OF THE DRAWINGS

These and/or other aspects of embodiments will become apparent and more readily appreciated from the following description of embodiments, taken in conjunction with the accompanying drawings of which:

FIG. 9 is a flowchart illustrating a control method of the walking robot in accordance with an embodiment.

DETAILED DESCRIPTION

Figure 1:
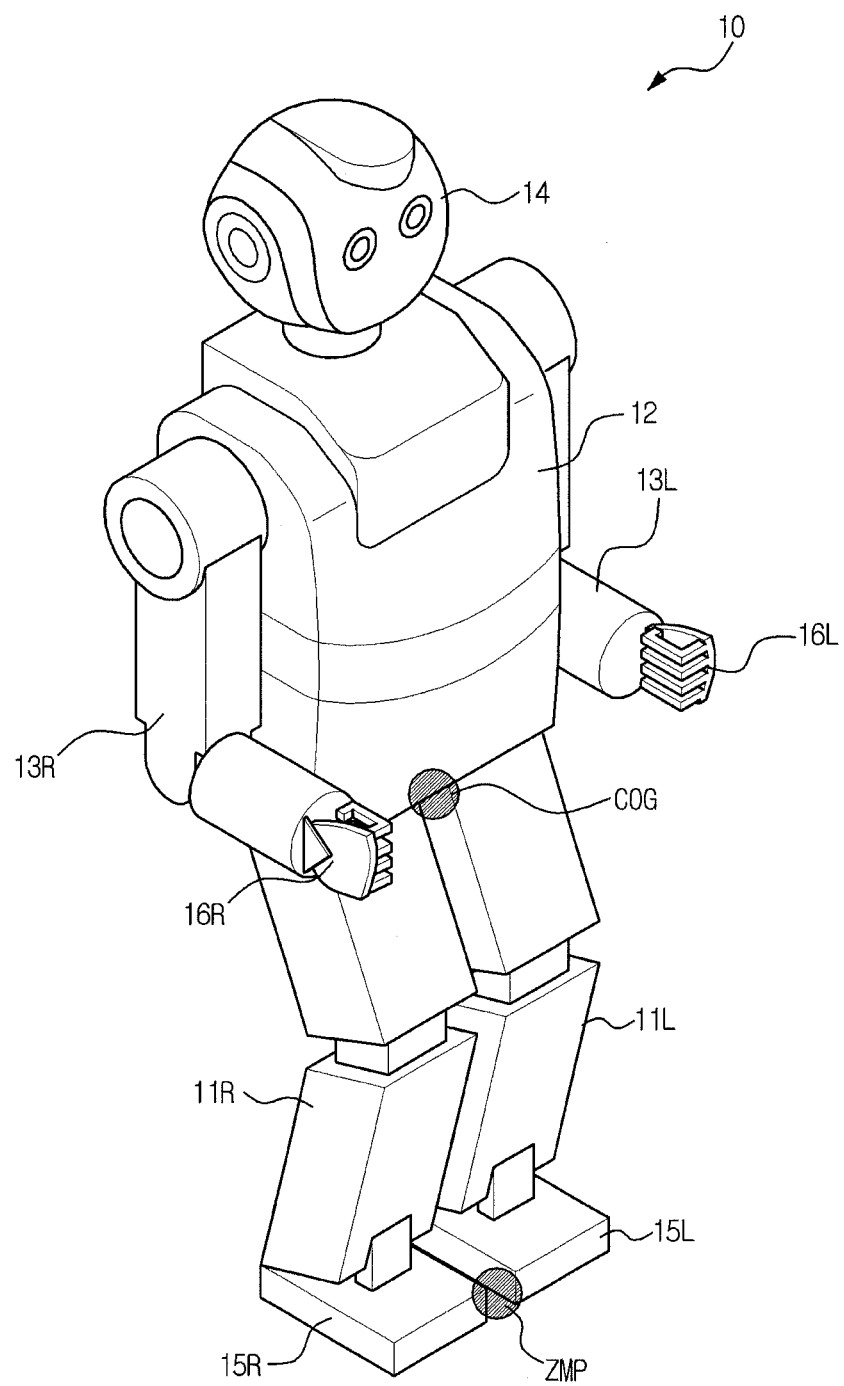
FIG. 1 is a view illustrating the external appearance of a legged walking robot in accordance with an embodiment.

Reference will now be made in detail to embodiments, examples of which are illustrated in the accompanying drawings, wherein like reference numerals refer to like elements throughout.

FIG. 1 is a view illustrating the external appearance of a walking robot in accordance with an embodiment. As shown in FIG. 1, a robot 100 is a bipedal walking robot which moves erect in the same manner as a human, and includes a torso 12, two arms 13R and 13L and a head 14 provided at the upper portion of the torso 12, two legs 11R and 11L, feet 15R and 15L provided at the front ends of the legs 11R and 11L and hands 16R and 16L provided at the front ends of the arms 13R and 13L. Here, R and L respectively indicate the right and left sides of the robot 10, COG indicates the position of the center of gravity of the robot 10, and ZMP indicates a point where the sum of moment in the roll direction (in the x axis direction, i.e., the proceeding direction of the robot), moment in the pitch direction (in the y axis direction, i.e., the direction of a step width) on the contact plane between the robot 10 and the ground becomes 0.

Figure 2:
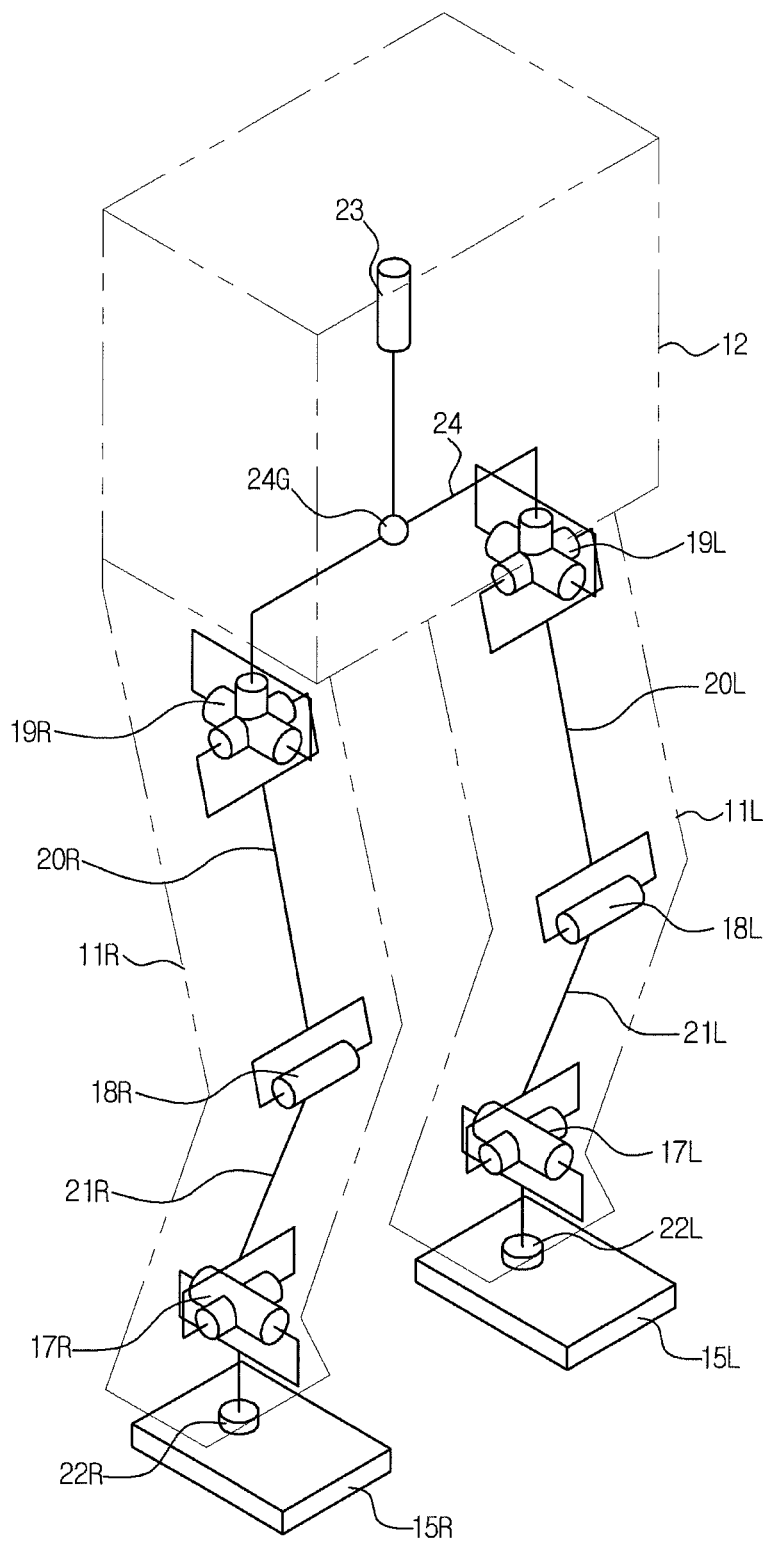
FIG. 2 is a view illustrating main joint structures of the legged walking robot in accordance with an embodiment.

FIG. 2 is a view illustrating main joint structures of the walking robot shown in FIG. 1. As shown in FIG. 2, the two legs 11R and 11L respectively include ankle joints 17R and 17L, knee joints 18R and 18L, and hip joints 19R and 19L to rotate parts of the robot 10 corresponding to ankles, knees and hips, and the hip joints 19R and 19L are located at ends of both sides of the lower portion of the torso 12 connected to the two legs 11R and 11L.

The ankle joints 17R and 17L of the respective legs 11R and 11L are movable in the x axis direction (in the roll direction, i.e., the proceeding direction of the robot) and in the y axis direction (in the pitch direction, i.e., the direction of the step width), the knee joints 18R and 18L of the respective legs 11R and 11L are movable in the y axis direction (in the pitch direction), and the hip joints 19R and 19L of the respective legs 11R and 11L are movable in the x axis direction (in the roll direction), in the y axis direction (in the pitch direction) and in the z axis direction (in the yaw direction).

The two legs 11R and 11L further include upper links 20R and 20L connecting the hip joints 19R and 19L and the knee joints 18R and 18L and lower links 21R and 21L connecting the knee joints 18R and 18L and the ankle joints 17R and 17L, and enable the robot 10 to walk with designated levels of degree according to movement of the joints 17R, 17L, 18R, 18L, 19R and 19L. Force/torque sensors (hereinafter, referred to as F/T sensors) 22R and 22L are installed at ankles of the respective legs 11R and 11L, measure three-directional components Fx, Fy and Fz of forces and three-directional components Mx, My and Mz of moments transmitted from the feet 15R and 15L, and provide ZMP information.

The torso 12 connected to the two legs 11R and 11L includes a waist joint 23 to rotate a part of the robot 10 corresponding to a waist, and the waist joint 23 is collinear with a central position 24G of a hip link 24 connecting the hip joints 19R and 19L located at the ends of both sides of the lower portion of the torso 12. Although not shown in the drawings, all the joints 17R, 17L, 18R, 18L, 19R, 19L and 23 respectively include actuators (for example, electric devices, such as motors) to drive the joints 17R, 17L, 18R, 18L, 19R, 19L and 23.

Figure 3:
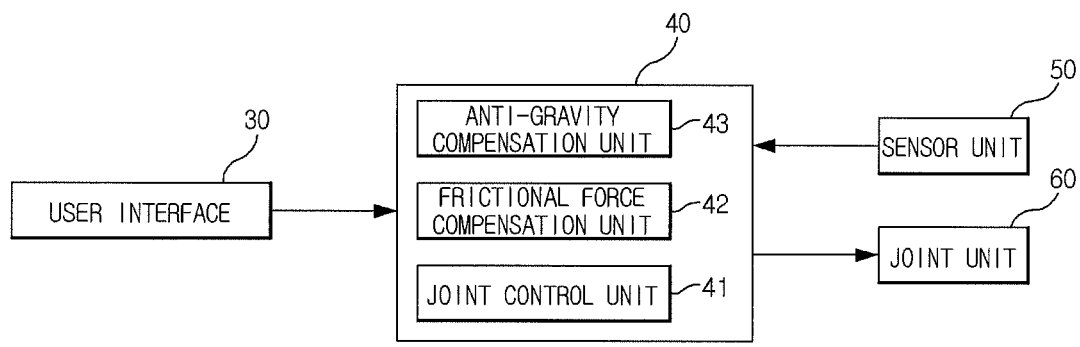
FIG. 3 is a block diagram of a control apparatus of the legged walking robot in accordance with an embodiment.

FIG. 3 is a block diagram of a control apparatus of the walking robot in accordance with an embodiment. As shown in FIG. 3, the control apparatus of the walking robot in accordance with an embodiment includes a control unit 40, a user interface 30 to which a user command to control the robot is input, a joint unit 60 to drive the actuators, such as the motors installed at the respective joints of the robot, and a sensor unit 50 installed at the robot to measure forces applied to the respective joints or pose information of the robot.

The control unit 40 controls motions of the robot based on the user command input through the user interface 30 and the information provided from the sensor unit 50.

The control unit 40 includes a joint control unit 41, a frictional force compensation unit 42, and an anti-gravity compensation unit 43. The joint control unit 41 generates joint signals to control movement of the joint unit 60 using target joint angles of the joints of the robot as control input and current joint angles input through the sensor unit 12 and outputs the generated joint signals to the joint unit 60, thereby controlling movement of the joint unit 60.

The frictional force compensation unit 42 controls movement of the respective joints of the robot in a manner of receiving target joint angular velocities of the joints of the robot as control input, executing modeling of frictional forces of the respective joints, generating compensation signals corresponding to the frictional forces of the respective joints, and adding the compensation signals to joint signals output from the joint unit 60 by the joint control unit 41, thereby compensating for frictional forces of the respective joints in a manner of offsetting mechanical frictional forces of the respective joints. That is, the frictional force compensation unit 42 causes the respective joints of the robot to be operated as if the respective joints have no mechanical frictional force. Thereby, change of the position of the ZMP is minimized and thus the soles of feet of the robot are attached to the ground. Here, a frictional force estimator or an acceleration sensor may be used to detect the frictional force of the joint of the robot. Such a method estimates or measures variation of acceleration due to the frictional force based on the precise parameter of the joint of the robot, thereby estimating the frictional force.

The anti-gravity compensation unit 43 controls movement of the respective joints of the robot in a manner of receiving target joint angles of the joints of the robot as control input, executing modeling of anti-gravities of the respective joints, generating compensation signals corresponding to the anti-gravities of the respective joints, and adding the compensation signals to joint signals output from the joint unit 60 by the joint control unit 41, thereby causing gravities applied to the respective joints of the robot to be operated as if the gravities are applied in the anti-gravity direction opposite to the gravity direction and thus compensating for anti-gravities of the respective joints. That is, the anti-gravity compensation unit 43 controls movement of the respective joints as if the gravity is applied to the respective joints in the reverse direction and thus enabling the robot to maintain the erect state.

By the above-described frictional force compensation and anti-gravity compensation, the robot may maintain the erect state without falling even if external force is applied to the robot, and thus maintain balance.

Figure 4:
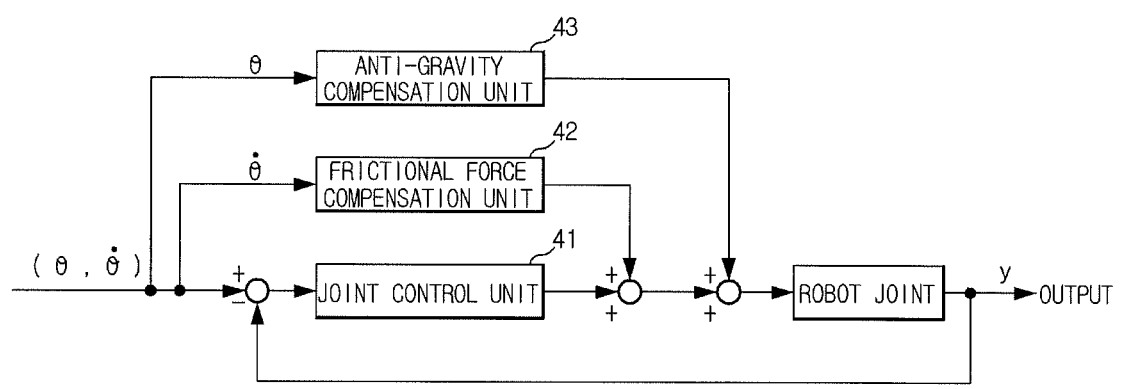
FIG. 4 is a view illustrating a detailed control method of a control unit shown in FIG. 3.

FIG. 4 is a view illustrating a detailed control method of the control unit shown in FIG. 3. As shown in FIG. 4, the control apparatus of the walking robot in accordance with an embodiment includes a control loop using sensor feedback implemented by the joint control unit 41, which is a general method to control joints of the robot, and adds two feed forward control loops to the control loop. The two feed forward control loops include a feed forward control loop for frictional force compensation executed by the frictional force compensation unit 42 and a feed forward control loop for anti-gravity compensation executed by the anti-gravity compensation unit 43. Here, instead of the feed forward control loop for anti-gravity compensation, the feedback control loop may be used to achieve anti-gravity compensation.

Frictional force of a joint of a robot used in the feed forward control loop for frictional force compensation is a function expressed by the angular velocity of the joint of the robot, and gravity applied to the joint used in the feed forward control loop for anti-gravity compensation is a function expressed by the angle of the joint of the robot. These functions may be acquired based on physical modeling given in a robot design stage, and be verified by experimentation or simulation.

The joint control unit 41 used in the control loop using sensor feedback may be one of a proportional (P) controller, a proportional integral (PI) controller, a proportional differential (PD) controller, and a proportional integral differential (PID) controller.

The feed forward control loop for frictional force compensation compensates for frictional forces of the joints of the robot by receiving target joint angular velocities of the joints of the robot as control input, executing modeling of the frictional forces of the joints, generating compensation signals corresponding to the frictional forces of the joints, and providing the compensation signals to the joints of the robot. Thereby, the mechanical frictional forces of the joints of the robot are compensated for, and thus the joints of the robot are operated as if the joints have no mechanical frictional force.

The feed forward control loop for anti-gravity compensation compensates for anti-gravities of the joints of the robot by receiving target joint angles of the joints of the robot as control input, executing modeling of the anti-gravities of the joints, generating compensation signals corresponding to the anti-gravities of the joints, and providing the compensation signals to the joints of the robot. Thereby, the joints of the robot are operated as if the gravity is applied to the joints of the robot in the reverse direction, thus enabling the robot to maintain the erect state.

Hereinafter, effects frictional forces of the respective joints of the walking robot on the ZMP to describe the operation of the walking robot will be described.

Figure 5:
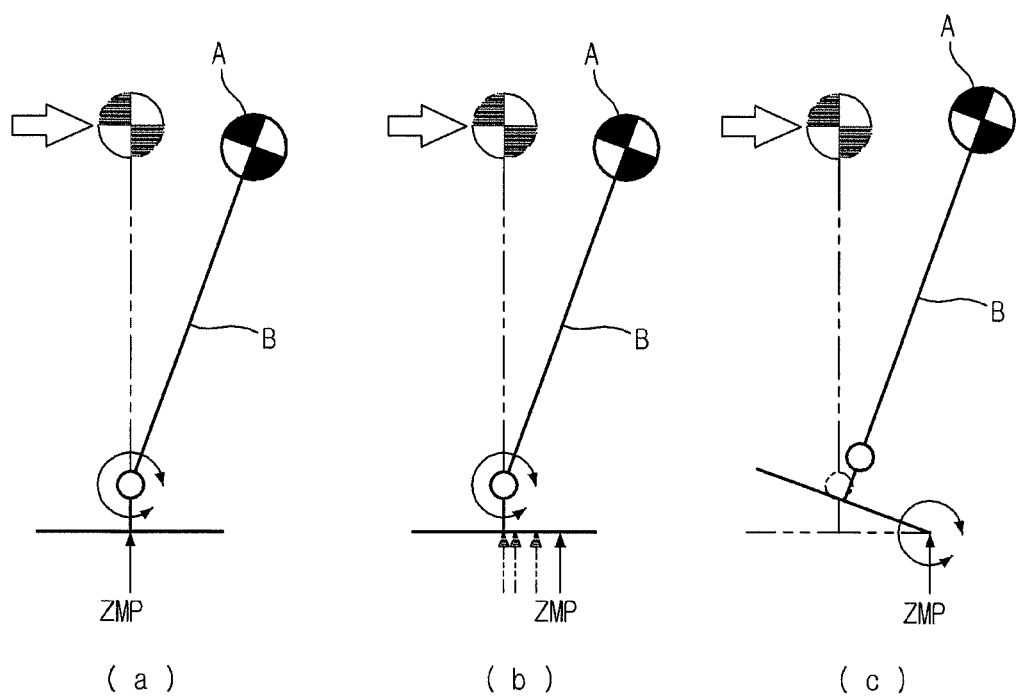
FIGS. 5(a) to 5(c) are views illustrating relations between frictional force applied to a robot joint and the position of a ZMP.

FIGS. 5(*a*) to 5(*c*) are views illustrating how to operate a walking robot model having one joint when the walking robot standing erect falls free due to external force applied thereto, shown by arrows. Here, A represents a pendulum and B represents a pendulum axis when movement of the joint of the robot is expressed as pendulum movement.

FIG. 5(*a*) illustrates the joint of the robot to which no frictional force is applied, FIG. 5(*b*) illustrates the joint of the root to which weak frictional force is applied, and FIG. 5(*c*) illustrates the joint of the robot to which strong frictional force is applied.

On the assumption that gravity is applied to an identical structure to which no frictional force is applied, the structure falls free along a trajectory satisfying mechanical constraints. However, since mechanical frictional force is substantially applied to the structure, the structure moves at a speed lower than the free fall speed or stops.

As shown in FIG. 5(*a*), when no frictional force is applied to the joint of the robot, the position of the ZMP (shown in the arrow going from the bottom to the sole of the foot) is located under the joint at all times.

However, as shown in FIG. 5(*b*), when weak frictional force is applied to the joint of the robot, the ZMP moves but does not deviate outward from the sole of the foot, i.e., the support plane.

On the other hand, as shown in FIG. 5(*c*), when strong frictional force is applied to the joint of the robot, since the joint of the robot does not move owing to the strong frictional force, the external force moves the sole of the foot using one end of the sole of the foot as an axis. Here, the ZMP is located at the end of the sole of the foot used as the axis.

As shown in FIGS. 5(*a*) to 5(*c*), if the robot falls free, change of the position of the ZMP decreases as the frictional force decreases. Since a state in which the ZMP is located within the support plane and change of the position of the ZMP is small is regarded as a state in which the robot remains balanced, frictional force compensation assists the robot in maintaining balance.

However, the robot is incapable of maintaining balance only by compensating for frictional force of the joint of the robot. In order to allow the robot to maintain balance, the robot needs to maintain an erect standing state. An embodiment proposes a control method to maintain the erect standing state of a robot by controlling movement of joints of the robot so as to reverse the gravity direction of the robot.

Hereinafter, application of gravity to the joint of the robot in the reverse direction will be described.

Figure 6:
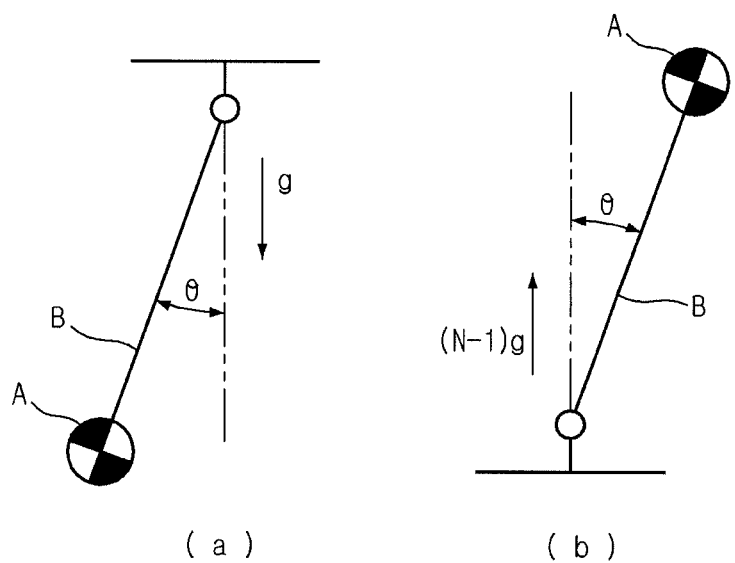
FIG. 6(a) is a view illustrating application of gravity to the legged walking robot in accordance with an embodiment in the gravity direction.
FIG. 6(b) is a view illustrating application of (N−1) times gravity to the legged walking robot in accordance with an embodiment in the anti-gravity direction.

FIG. 6(*a*) is a view illustrating application of gravity to the joint of the robot in accordance with an embodiment in the gravity direction, and FIG. 6(*b*) is a view illustrating application of (N−1) times gravity to the joint of the robot in accordance with an embodiment in the anti-gravity direction.

As shown in FIG. 6(*a*), the pendulum A is hung in the gravity direction.

Under the condition that there is no input torque for control or no force applied from the outside, movement of such a pendulum is expressed by a dynamic equation, i.e., Equation 1 below.

$$M(\theta(t))\ddot{\theta}(t) + C(\theta(t),\dot{\theta}(t))\dot{\theta}(t) + g(\theta(t)) = 0 \qquad \text{Equation 1}$$

Here, θ(t) is an n×1 position vector of the joint, M(θ(t)) is an n×n inertia matrix 1, C(θ(t),θ̇(t)) is an n×1 vector representing centripetal force and Coriolis force, and g(θ(t)) is an n×1 gravity vector.

The pendulum shown in FIG. 6(*a*) continuously executes downward pendulum movement due to gravity.

As shown in FIG. 6(*b*), on the assumption that such a robot model is turned over and the gravity direction becomes the upward direction, the model is shown as if the pendulum executes upward pendulum movement. If input torque $Ng(\theta(t))$, i.e., N times the gravity vector $g(\theta(t))$, to reverse the gravity direction to the upward direction is applied to the joint of the robot, the dynamic equation of the joint of the robot is expressed by Equation 2 below.

$$M(\theta(t))\theta(t)+C(\theta(t),\theta(t))\theta(t)+g(\theta(t))=Ng(\theta(t)) \quad \text{Equation 2}$$

In summary, the dynamic equation is expressed by Equation 3 below.

$$M(\theta(t))\theta(t)+C(\theta(t),\theta(t))\theta(t)+(1-N)g(\theta(t))=0 \quad \text{Equation 3}$$

Here, N is a constant.

As shown in FIG. 6(b), movement of the joint of the robot is controlled such that the joint of the robot is operated as if (N-1) times gravity is applied to the joint in the upward direction. Here, as N increases, the joint of the robot rapidly converges upon a target value and the swing width of the joint of the robot decreases.

Figure 7:
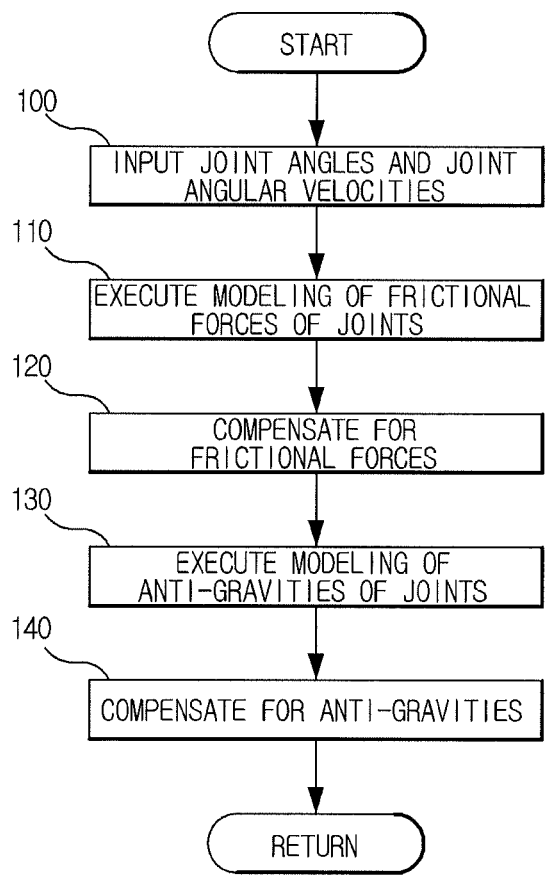
FIG. 7 is a flowchart illustrating a control method of the legged walking robot in accordance with an embodiment.

FIG. 7 is a flowchart illustrating compensation of frictional forces and anti-gravities of the joints in the control apparatus of the walking robot in accordance with an embodiment.

With reference to FIG. 7, the control unit 40 receives target joint angles and target joint angular velocities as control input to move the joints of the robot (Operation 100).

Thereafter, the control unit 40 executes modeling of frictional forces of the joints based on the joint angular velocities of the joints (Operation 110). Here, the frictional forces are estimated based on the joint angular velocities of the joints and compensation signals corresponding to the frictional forces to compensate for the frictional forces are generated.

After the modeling of the frictional forces of the joints, the control unit 40 controls movement of the joints by providing the compensation signals corresponding to the frictional forces of the joints to the joint unit 60 using feed forward control, thereby compensating for the frictional forces of the joints (Operation 120). Thereby, the mechanical frictional forces of the joints are offset and the joints are operated as if the joints have no mechanical frictional force. That is, since the joints are operated as if the joints have no mechanical frictional force, change of the position of the ZMP is minimized and the soles of the feet of the robot are attached to the ground.

After the compensation of the frictional forces of the joints, the control unit 40 executes modeling of anti-gravities of the joints based on the joint angles of the joints (Operation 130). Here, the anti-gravities are estimated based on the joint angles of the joints and compensation signals corresponding to the anti-gravities to compensate for the anti-gravities are generated.

After the modeling of the anti-gravities of the joints, the control signals 40 controls movement of the joints by providing the compensation signals corresponding to the anti-gravities of the joints to the joint unit 60 using feed forward control, thereby compensating for the anti-gravities of the joints (Operation 140). Thereby, the joints of the robot are operated as if gravity is applied to the joints in the reverse direction, and thus the robot maintains the erect standing state.

Further, in order to solve difficulty in maintaining stability when external force is applied or a step length or velocity of a walking robot is changed because the conventional robot model executes passive dynamic walking and stably walks only in a specific limit cycle according to environment, another embodiment proposes a control method in which virtual gravities are applied to two legs of a walking robot in the opposite direction to the gravity direction.

Figure 8:
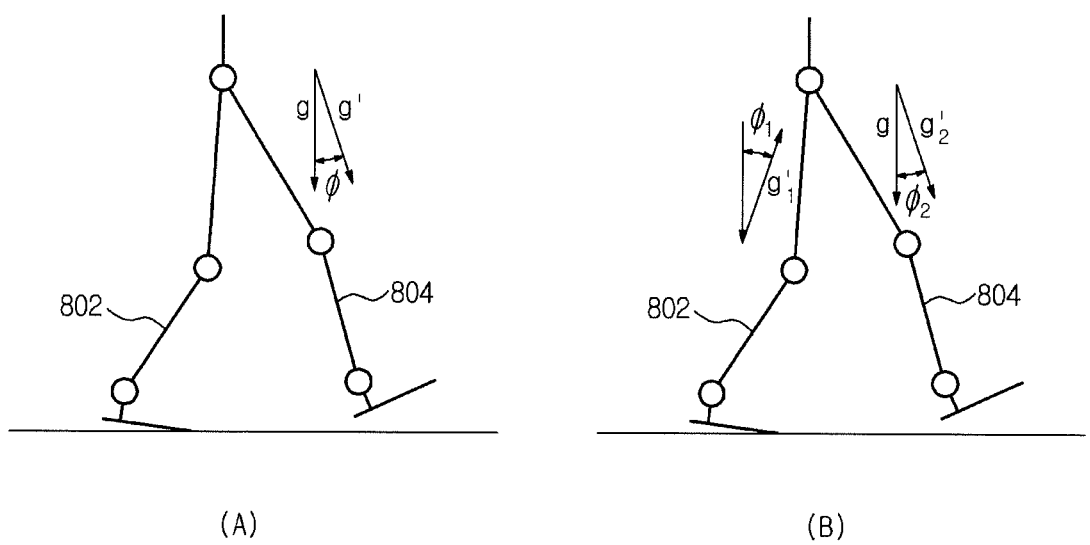
FIGS. 8(A) and 8(B) are views illustrating virtual gravities applied to legs of a walking robot in accordance with another embodiment.

FIGS. 8(A) and 8(B) are views illustrating virtual gravities applied to legs of the walking robot in accordance with an embodiment. FIGS. 8(A) and 8(B) illustrate two methods of controlling a bipedal walking robot including two links and three point masses. FIG. 8(A) illustrates a virtual gravity control method in walking using the conventional passive walking method, and such a method uses a phenomenon in which the walking robot may move downward along an inclined plane having a specific inclination angle even if no drive force is applied to the walking robot on the inclined plane. Therefore, in the case of FIG. 8(A), virtual gravity is applied so that the direction of gravity applied to the entirety of the walking robot is inclined at a designated angle φ. This is expressed by Equation 4 below.

$$M(\theta(t))\theta(t)+C(\theta(t),\theta(t))\theta(t)+g(\theta(t))=u(t) \quad \text{Equation 4}$$

In Equation 4 above, the left member is the dynamic equation representing the motion of the robot by modeling the robot, and the right member represents torque input applied to each of the joints. In the conventional passive walking, gravity $g(\theta(t))$ applied to a system is compensated for and control input is applied as if virtual gravity $g'(\theta(t))$ is applied at a designated angle. That is, when torque input expressed by Equation 5 below is applied to Equation 4, Equation 6 is acquired, and in summary, Equation 7 is acquired.

$$u(t)=g(\theta(t))-g'(\theta(t)) \quad \text{Equation 5}$$

$$M(\theta(t))\theta(t)+C(\theta(t),\theta(t))\theta(t)+g(\theta(t))=g(\theta(t))-g'(\theta(t)) \quad \text{Equation 6}$$

$$M(\theta(t))\theta(t)+C(\theta(t),\theta(t))\theta(t)+g'(\theta(t))=0 \quad \text{Equation 7}$$

That is, by applying the torque input expressed by Equation 5 above, walking of the walking robot on an inclined plane at a designated angle is carried out.

In accordance with an embodiment, virtual gravities differing from that in the conventional passive walking are respectively applied to two legs of the walking robot, thereby carrying out walking of the walking robot. That is, when input expressed by Equation 8 below is applied to Equation 1, Equation 9 is acquired, and in summary, Equation 10 is acquired.

$$u(t) = g(\theta(t)) - \begin{bmatrix} g'_1(\theta(t)) \\ g'_2(\theta(t)) \end{bmatrix} \quad \text{Equation 8}$$

$$M(\theta(t))''\theta(t) + C(\theta(t), '\theta(t))'\theta(t) + g(\theta(t)) = g(\theta(t)) - \begin{bmatrix} g'_1(\theta(t)) \\ g'_2(\theta(t)) \end{bmatrix} \quad \text{Equation 9}$$

$$M(\theta(t))''\theta(t) + C(\theta(t), '\theta(t))'\theta(t) + \begin{bmatrix} g'_1(\theta(t)) \\ g'_2(\theta(t)) \end{bmatrix} = 0 \quad \text{Equation 10}$$

Thereby, as shown in FIG. 8(B), the walking robot may be controlled as if different virtual gravities are applied to the two legs of the walking robot.

In Equations 8, 9 and 10 above, $g_1'(\theta(t))$ is first virtual gravity applied to a support leg 802 and $g_2'(\theta(t))$ is second virtual gravity applied to a swing leg 804, and a walking form of the walking robot is determined by the two virtual gravities. Fundamentally, an angle $\phi_1$ of the first virtual gravity $g_1'(\theta(t))$ applied to the support leg 802 is determined by a processing direction and a velocity of anti-gravity. An angle $\phi_2$ of the second virtual gravity $g_2'(\theta(t))$ applied to the swing leg 804 is determined by a processing direction and a velocity of original gravity applied in the downward direction. Therefore, a walking direction or a walking velocity is varied by the angle $\phi_1$ and the angle $\phi_2$.

FIG. 9 is a flowchart illustrating a control method of the walking robot in accordance with an embodiment. In the control method shown in FIG. 9, virtual gravity in the anti-gravity direction is applied to the support leg and virtual gravity in the gravity direction is applied to the swing leg, thereby enabling the walking robot to maintain stability when the step length or velocity of the walking robot is changed or external force is applied to the walking robot during walking.

As shown in FIG. 9, when a walking command is input (Operation 902), a support leg 802 and a walking leg 804 are determined (Operation 904). That is, which leg from among two legs serves as the support leg and which leg from among the two legs serves as the swing leg are determined. When the swing leg 804 is determined, gravity compensation torque is applied to the respective joints of the two legs 802 and 804 so as to operate the joints as if gravity is not applied to the two legs 802 and 804 (Operation 906). Substantial walking starts from a motion of lifting the swing leg upward (Operation 908). Such a lifting motion may be unnecessary because sizes and shapes of feet are varied according to robots. Thereafter, first virtual gravity torque applied in the direction of the sum of a proceeding direction vector and an anti-gravity direction vector is applied to the respective joints of the support leg 802 (Operation 910). Simultaneously, second virtual gravity torque applied in the direction of the sum of the proceeding direction vector, determined by the walking velocity and stride, and a gravity vector is applied to the respective joints of the swing leg 804 (Operation 912). Thereby, the support let 802 is inclined in the proceeding direction and the swing leg 804 swings in the proceeding direction. Such control is maintained before the swing leg 804 contacts the ground (yes of Operation 914), and, when the swing leg 804 contacts the ground, functions of the two legs 802 and 804 are interchanged (Operation 916). That is, the swing leg 804 becomes a support leg in the next step and the support leg 802 becomes a swing leg and is lifted upward in the next step. When the walking robot reaches a target position through such walking, walking of the walking robot is ended (yes of Operation 918).

The embodiments can be implemented in computing hardware and/or software, such as (in a non-limiting example) any computer that can store, retrieve, process and/or output data and/or communicate with other computers. For example, control unit 40 in FIG. 3 may include a computer to perform calculations and/or operations described herein. A program/software implementing the embodiments may be recorded on non-transitory computer-readable media comprising computer-readable recording media. Examples of the computer-readable recording media include a magnetic recording apparatus, an optical disk, a magneto-optical disk, and/or a semiconductor memory (for example, RAM, ROM, etc.). Examples of the magnetic recording apparatus include a hard disk device (HDD), a flexible disk (FD), and a magnetic tape (MT). Examples of the optical disk include a DVD (Digital Versatile Disc), a DVD-RAM, a CD-ROM (Compact Disc-Read Only Memory), and a CD-R (Recordable)/RW.

As is apparent from the above description, a walking robot and a control method thereof in accordance with an embodiment implement a natural walking motion having a low energy consumption rate.

Although a few embodiments have been shown and described, it would be appreciated by those skilled in the art that changes may be made in these embodiments without departing from the principles and spirit of the invention, the scope of which is defined in the claims and their equivalents.

What is claimed is:

1. A control method of a walking robot having two legs and which walks using the two legs, the control method comprising:
applying a first torque including a vector component in an anti-gravity direction to respective joints of a support leg from among the two legs of the walking robot during walking so that the support leg is inclined in a proceeding direction; and
applying a second torque including a vector component in a gravity direction to respective joints of a swing leg from among the two legs of the walking robot during walking so that the swing leg swings in the proceeding direction wherein the first torque compensates for the effects of gravity, and wherein the second torque compensates for the effects of antigravity.

2. The control method according to claim 1, wherein:
the first torque is applied in a direction of the sum of a vector in a proceeding direction and a vector in the anti-gravity direction; and
the second torque is applied in a direction of the sum of the vector in the proceeding direction and a vector in the gravity direction.

3. The control method according to claim 2, wherein the first torque and the second torque have an intensity of gravity.

4. The control method according to claim 1, further comprising applying gravity compensation torque to the respective joints of the two legs before the walking robot starts walking.

5. The control method according to claim 1, further comprising lifting the swing leg upward after applying gravity compensation torque to the respective joints of the two legs.

6. The control method according to claim 1, further comprising interchanging functions of the swing leg and the support leg, when the swing leg contacts the ground.

7. A walking robot comprising:
two legs for walking; and
a control unit to apply a first torque including a vector component in an anti-gravity direction to respective joints of a support leg from among the two legs of the walking robot during walking so that the support leg is inclined in a proceeding direction, and to apply a second torque including a vector component in a gravity direction to respective joints of a swing leg from among the two legs of the walking robot during walking so that the swing leg swings in the proceeding direction wherein the first torque compensates for the effects of gravity, and wherein the second torque compensates for the effects of antigravity.

8. The walking robot according to claim 7, wherein:
the first torque is applied in a direction of the sum of a vector in a proceeding direction and a vector in the anti-gravity direction; and
the second torque is applied in a direction of the sum of the vector in the proceeding direction and a vector in the gravity direction.

9. The walking robot according to claim 8, wherein the first torque and the second torque have an intensity of gravity.

10. The walking robot according to claim 7, wherein the control unit applies gravity compensation torque to the respective joints of the two legs before the walking robot starts walking.

11. The walking robot according to claim 7, wherein the control unit lifts the swing leg upward after applying gravity compensation torque to the respective joints of the two legs.

12. The walking robot according to claim 7, wherein the control unit interchanges functions of the swing leg and the support leg, when the swing leg contacts the ground.

13. A control method of a walking robot including two legs and which walks using the two legs, the control method comprising:
- applying gravity compensation torque to respective joints of the two legs before the walking robot starts walking;
- applying a first torque having an intensity of gravity to respective joints of a support leg from among the two legs during walking in a direction of the sum of a vector in a proceeding direction and a vector in an anti-gravity direction so that the support leg is inclined in the proceeding direction; and
- applying a second torque having the intensity of gravity to respective joints of a swing leg from among the two legs during walking in a direction of the sum of the vector in the proceeding direction and a vector in a gravity direction so that the swing leg swings in the proceeding direction wherein the first torque compensates for the effects of gravity, and wherein the second torque compensates for the effects of antigravity.

14. The control method according to claim 13, further comprising lifting the swing leg upward after the application of the gravity compensation torque to the respective joints of the two legs.

15. The control method according to claim 13, further comprising interchanging functions of the swing leg and the support leg, when the swing leg contacts the ground.

* * * * *